3,166,377
PREPARATION OF HYDRAZINE BORANES
John A. Brown, Berkeley Heights, N.J., assignor to Esso Research and Engineering Company, a corporation of Delaware
No Drawing. Filed Aug. 29, 1960, Ser. No. 52,730
9 Claims. (Cl. 23—14)

The present invention relates to the preparation of hydrazine boranes and more particularly it concerns the synthesis of hydrazine monoborane and hydrazine diborane by reacting a borohydride, such as sodium borohydride, with hydrazine in the presence of an acidic substance, such as phosphoric acid.

A great deal of research work has been undertaken in recent years to find suitable monopropellants that are capable of propelling rocket devices. Solid monopropellants that are stable at ambient temperatures are highly desirable as motors in "pure" rockets, i.e. thrust producers which do not use the surrounding atmosphere, because they can be stored for long periods of time and are ready for immediate use. The term "monopropellant" as used herein means a substance which does not need any other substance to bring about the release of its thermochemical energy.

It has now been discovered that hydrazine will react with a borohydride to form hydrazine monoborane and/or hydrazine diborane if the two reactants are contacted in the presence of an acidic substance. Heretofore, it was believed necessary to use a hydrazine reactant containing either a mono- or diprotic hydrazinium ion when borohydrides are used in order to prepare the aforementioned boranes. It has now been found that the reaction will proceed without using a hydrazine salt, that is to say, hydrazine itself may be added directly to the reaction zone and the synthesis will take place provided there is an acidic substance present. The process described herein has special application to the preparation of hydrazine diborane since this is difficult to make by other methods.

In carrying out the present invention, hydrazine and a borohydride, preferably an inorganic alkali metal borohydride, are mixed with an acid or an acid salt at ambient temperatures and atmospheric pressure for a sufficient period of time to form the desired amount of borane product. Room temperature and atmospheric pressure are generally preferred since the reaction readily takes place under these conditions. However, if desired lower temperatures, e.g. as low as −80° C., and elevated temperatures may be employed. In general it is best to maintain the reaction temperature between about 0 and 40° C. The pressure under which the reaction is effected is not critical provided there is sufficient pressure present to maintain the reactants in a liquid state.

The reaction time may range from as little as 10 minutes up to 10 hours, depending upon the particular reactants selected and the reaction conditions, such as the degree of agitation and the temperature at which the reaction is carried out. When ambient conditions are employed, the reaction time is usually about 15 minutes to 2 hours. In most instances, an inert liquid diluent, which may or may not, be a solvent for the reaction product, should be used. The diluent, if desired, can be admixed with one or all of the reactants prior to contacting them in the reaction zone. By "inert" is meant that it should not contain any functional groups which will react with or interfere in any way with the formation of the borane products. Among the common inert liquid organic and inorganic diluents that can be used are $C_5$ to $C_{10}$ hydrocarbons, such as benzene, heptane, nonane and hexane, esters such as ethyl acetate, amides such as dimethyl formamide and acetals such as methylal. Carbonyl compounds, i.e. aldehydes and ketones, and alcohols are usually not satisfactory diluents. The preferred diluents are 5 or 6 member heterocyclic ethers, such as tetrahydrofuran, dihydropyran and dioxan, because they are solvents for the hydrazine borane products. These solvents facilitate the separation of the product from the reaction mixture because the nongaseous by-products are often insoluble in these ethers. Thus, by using organic cyclic ethers, separation can be accomplished by filtration and evaporation of the solvent. Moreover, in a continuous process, the cyclic ether can be continuously removed from the reaction zone, flashed or distilled from the product and recycled to the reactor. The amount of diluent used in the reaction mixture is not critical. Of course, a substantial quantity, e.g. 50 to 99.5 wt. percent, should be present in the reaction zone to permit easy handling of the reactants. Where the diluent is not a selective solvent for the product, separation may be achieved by distilling or filtering off the diluent and recovering the hydrazine boranes from the residue by sublimation. Any other separation techniques known in the art may also be employed, such as selective extraction and evaporation of the solvent.

The atmosphere of the reaction zone is preferably filled with an inert gas, such as nitrogen, helium or argon in order to avoid any possible degradation of the final products. If desired, the reactor, which may be a glass or stainless steel vessel, can be flushed with an inert gas prior to starting the run. Thereafter the inert gas may be circulated through the reactor to remove the hydrogen formed during the reaction. Since the hydrogen evolved during the reaction flushes out any air in the reactor, it is not necessary to employ an extraneous gas for this purpose once the reaction has commenced.

The amount of borohydride and acidic substance added to the reaction zone will depend on whether or not the final product is to be hydrazine monoborane or hydrazine diborane. In order to prepare the former compound, one equivalent of borohydride and one equivalent, or slightly more, of the acidic substance should be mixed with one mole of hydrazine. In other words, approximately stoichiometric amounts of the reactants and acid promoter should be employed. For example, when preparing hydrazine diborane two equivalents of borohydride and two equivalents of the acidic substance are used per mole of hydrazine. In a typical reaction 1 to 2 equivalents of the borohydride and the acidic substance are used per mole of hydrazine.

The borohydride reactant may be any stable ionic salt, such as a metal borohydride or a nitrogen-containing borohydride. The preferred inorganic metal borohydrides are the alkali metal borohydrides, such as sodium, lithium or potassium borohydride. Other metal borohydrides, such as aluminum or the alkaline earth metals, e.g. calcium and magnesium, can be used. Quaternary ammonium salts, such as the tetraalkyl ammonium borohydrides, e.g. tetraethyl or tetramethyl ammonium borohydride, are also satisfactory. The preferred reactants are sodium borohydride and hydrazine.

The acidic substance may be inorganic or organic and is usually an active or moderately active acid or an acid salt, that is to say, a salt which is acidic in an aqeous solution. The acids may be broadly defined as Lewis acids which are generally defined as compounds capable of accepting electrons. Among the acids which may be employed to promote or assist in the formation of the borane products are mineral acids, such as hydrochloric, hydrobromic, hydriodic, nitric, sulfuric, phosphoric and sulfurous acids, organic acids, such as formic and acetic acids, and acid salts containing boron, aluminum, tin, zinc, titanium, antimony and mercury. Chloride salts of the last named elements are especially useful. Many of the latter compounds are classified as Friedel-Crafts catalysts. Other suitable acid salts include ammonium chloride, ammonium sulfate, copper sulfate, magnesium chloride and ammonium nitrate.

Some of the acidic substances are capable of promoting the reaction with an explosive force if not properly diluted before they are contacted with hydrazine. This is particularly true in the case of the moderately active acids, such as phosphoric acid. It is therefore advisable to either cool the reaction zone to about 0° C. or employ large amounts of diluent when these acids are used to avoid any danger of explosion. For instance, the hydrazine and borohydride may be diluted with tetrahydrofuran and then the acid may be added in small amounts intermittently throughout the reaction. This procedure allows one to carefully control the reaction rate and avoids the formation of excess heat in the reaction zone. If the temperature is allowed to exceed about 50° C., decomposition of the monoborane product will commence. Thus, it is important to carefully regulate the temperature of the reaction when this substance is being made.

The reaction which occurs in the present process is surprising because hydrazine will not react with sodium borohydride under analogous conditions, nor will sodium borohydride react with an acidic substance, such as ammonium chloride. However, when all three components are added to the reaction zone a reaction takes place. While there is no intention to limit the present process to any theory, it is believed that the reaction between hydrazine and the ionic borohydride depends to a large extent upon the availability of the nitrogen electrons. It has been noted that, starting with hydrazine halides, the synthesis of hydrazine diborane is less rapid than that of the monoborane because in the preparation of the latter compound the hydrazine salt usually has a pair of electrons available to accept the borane group even before the hydrogen and sodium chloride have left the reaction site. It is believed that the acidic substance facilitates the reaction by imparting a partial positive charge to the hydrazine moiety.

It has been found that diethyl ether has a deleterious effect on the preparation of hydrazine boranes. Thus, it is important to avoid its use in the reaction mixture, although it may be used to purify or wash the final product once it has been formed.

The hydrazine diborane prepared in accordance with the process described herein is highly stable at room temperature (25° C.) and is only slightly sensitive to impact or friction. It has the empirical formula $B_2N_2H_{10}$ and is believed to have the following structure:

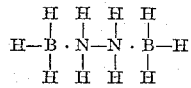

in which there are coordinate bonds between the nitrogen and boron atoms. The product looks amorphous but is crystalline when it is crystallized from the aforementioned ethers. It has no detectable melting point up to 260° C. It has a specific impulse of 286 sec.$^{-1}$, and when admixed with fuels, such as boron or aluminum, higher specific impulses are obtained.

The hydrazine diborane can be compounded with conventional materials used in solid rocket propellant systems, such as binders or adhesive substances. Because this monopropellant possesses an unusually low flame temperature, 1500 to 2000° K., it is especially suited for use in end burning rockets. End burning grains allow a more efficient use of the rocket case's volume and impose fewer mechanical (structural) limitations on the propellant. It is also useful as a coolant in rocket propellant mixtures which normally burn at high temperatures. If desired, an oxidizing agent, such as fluorine, can be included in the propellant mixture to change the combustion characteristics of the borane. The diborane may also be used in many chemical reactions as a reducing agent, e.g. in the preparation of oximes.

The hydrazine monoborane prepared in accordance with the process described herein is highly stable at room temperature (25° C.) and is neither impact nor friction sensitive. It has the empirical formula $B_1N_2H_7$ and is believed to have the following structure:

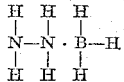

in which there are coordinate bonds between the nitrogen and boron atoms. The product is crystalline when isolated from the aforementioned ethers and melts with decomposition at 55° C. It has a specific impulse of 256 sec.$^{-1}$ and when admixed with other fuels, such as boron or aluminum, higher specific impulses are obtained, e.g. an impulse of 292 sec.$^{-1}$ when 1 mole of borane is mixed with 1 mole of boron. The hydrazine monoborane is also a highly suitable monopropellant, especially for use in end burning rockets. It possesses an unusually low flame temperature (1500 to 2000° K.). It is also useful as a coolant in rocket propellant mixtures which normally burn at high temperatures. If desired, an oxidizing agent, such as fluorine, can be included in the propellant mixture to change the combustion characteristics of the borane. Hydrazine monoborane is useful as a reducing agent in chemical reactions, e.g. reducing acetone to make isopropanol and it can be pyrolyzed to make hydrogen and boron nitride. Boron nitride is used in the manufacture of certain ceramics.

The following examples provide a better understanding of the process of the present invention, as well as its advantages:

*Example 1*

Sodium borohydride (1.27 grams; .016 mole) and 0.528 ml. of hydrazine (.008 mole) and 50 ml. THF were placed in a round bottom 100 ml. glass flask equipped with a stirrer and a wet meter to measure the amount of gas evolving from the reaction mixture. The flask was equipped with a water jacket which was used to maintain the temperature at about 25° C. Hydrochloric acid (1.23 grams; .016 mole) in 30 ml. of tetrahydrofuran was slowly dropped into the reaction flask over a period of 15 minutes while the reaction mixture was continually stirred. At the end of this time the reaction mixture was filtered and the infrared spectrum of a sample of tetrahydrofuran filtrate was made. The spectrum, which was compared with a spectrum obtained from a pure sample of hydrazine diborane, showed that the hydrazine diborane was present in the tetrahydrofuran solution. The tetrahydrofuran filtrate is then mixed with a sufficient amount of nonsolvent, such as n-hexane, to precipitate substantially all of the hydrazine diborane product. The precipitate is filtered and washed with additional hexane. The washed product is then dried in a vacuum desiccator at room temperature.

*Example 2*

The procedure described in Example 1 is repeated with the exception that 0.528 ml. $N_2H_4$ (.008 mole), 0.63 gram of $NaBH_4$ (.008 mole) and 0.61 gram (.008 mole) HCl are used. Upon completion of the room temperature, atmospheric pressure reaction, it is found that the tetrahydrofuran filtrate contains hydrazine monoborane. The product can be recovered in the manner described in the previous example.

*Example 3*

In another run, 3.85 grams (0.12 mole) of $N_2H_4$, 9.0 grams (0.24 mole) of $NaBH_4$ and 3 ml. of water were slurried in 100 ml. of tetrahydrofuran. Then 25 grams (0.25 mole) of $H_3PO_4$ in 35 ml. of tetrahydrofuran (THF) was slowly added to the slurry for about 1 hour. A vigorous reaction ensued, with the evolution of heat and hydrogen, and frequent cooling with ice was necessary. The mixture was then filtered and an aliquot sample of the filtrate was taken. It showed the characteristic infrared spectrum of hydrazine diborane.

The reaction mixture was then filtered and the filtrate diluted with petroleum ether, whereupon white crystals of hydrazine diborane (HDB) precipitated. The HDB was filtered off and removed. In order to avoid an explosion the precipitate should be washed with the diluent. Alternatively, an excess of $NaBH_4$ can be used.

Example 4

In still another run, 6.34 grams (0.16 mole) of $NaBH_4$ was slurried with 9.80 grams (0.16 mole) of $NH_4Cl$ and 50 ml. of THF. Then 2.68 grams (0.08 mole) of $N_2H_4$ was added. Vigorous bubbling ensued and the flask containing the mixture became warm. After 45 minutes, an aliquot sample was filtered and the infrared spectrum of the filtrate was compared to that of a THF solution of authentic HDB; they were identical. The bulk of the slurry was filtered and the filtrate was diluted with benzene. White crystals precipitated and they were filtered off and dried in a vacuum dessicator.

It is not intended to restrict the present invention to the foregoing examples which are merely given to demonstrate some of the embodiments of the invention. It should only be limited to the appended claims in which it is intended to claim all the novelty inherent in the invention as well as the modifications and equivalents coming within the scope and spirit of the invention.

What is claimed is:

1. Process for preparing hydrazine boranes having the empirical formulas $B_1N_2H_7$ and $B_2N_2H_{10}$ which comprises, reacting hydrazine with about one to two equivalents of a borohydride salt of a metal from the group consisting of alkali and alkaline earth metals and about one to two equivalents of an acid from the group consisting of mineral acids at least as strong as $H_3PO_4$ and ammonium chloride as a Lewis acid per mole of the hydrazine at a reaction temperature between about 0° and 40° C. in a reaction mixture containing an inert liquid diluent selected from the group consisting of tetrahydrofuran, dihydropyran, and dioxan, the equivalents of the borohydride salt and acid used being the same, controlling the rate of reaction by cooling the reaction mixture and controlling the rate at which the acid is admixed with the hydrazine in the presence of the borohydride salt, forming a solution of resulting hydrazine borane reaction product of the aforesaid formulas dissolved in said diluent, removing from the reaction mixture hydrogen gas evolved by the reaction, separating said solution of hydrazine borane from the undissolved borohydride salt and undissolved by-product, and recovering the dissolved hydrazine borane product from the inert liquid diluent.

2. The process according to claim 1 in which said hydrazine borane product is recovered from the inert liquid diluent solution thereof by precipitation from solution by a hydrocarbon liquid followed by filtration to separate the solid hydrazine borane precipitate from the inert liquid diluent and the hydrocarbon liquid.

3. The process as defined in claim 1 in which the borohydride salt is an alkali metal borohydride.

4. The process according to claim 1 in which the acid is phosphoric acid.

5. Process as defined in claim 1 in which the acid is hydrochloric acid.

6. Process for preparing hydrazine diborane having the empirical formula $B_2N_2H_{10}$, which comprises forming a mixture of hydrazine with two equivalents (2 moles) of sodium borohydride per mole of the hydrazine in liquid tetrahydrofuran as an inert liquid diluent, slowly adding to said mixture per mole of hydrazine therein two equivalents (2 moles) of hydrochloric acid diluted by liquid tetrahydrofuran, cooling and stirring the resulting reaction mixture to which the hydrochloric acid is added at a controlled rate to maintain said reaction mixture at about 25° C. as the reaction takes place with evolution of heat and hydrogen gas, stirring the reaction mixture until reaction is effected to form said hydrazine diborane which dissolves in the liquid tetrahydrofuran, separating thus-formed liquid solution of tetrahydrofuran containing the hydrazine diborane product from undissolved substances, and recovering said hydrazine diborane product from said liquid solution.

7. Process for preparing hydrazine monoborane having the empirical formula $B_1N_2H_7$ which comprises, forming a mixture of sodium borohydride with hydrazine in an equimolecular proportion mixed with liquid tetrahydrofuran as inert liquid diluent, slowly adding to said mixture hydrochloric acid diluted with liquid tetrahydrofuran to start reaction promptly and prevent explosive reaction until an equimolecular proportion of HCl with respect to the hydrazine is admixed, cooling the resulting reaction mixture to maintain said mixture at about 25° C. as hydrogen gas is evolved and said hydrazine monoborane is formed and is dissolved in the liquid tetrahydrofuran, separating thus-formed liquid solution of tetrahydrofuran containing the hydrazine monoborane product from undissolved substances, and recovering the dissolved hydrazine monoborane from its solution in the tetrahydrofuran.

8. Process for preparing hydrazine diborane having the empirical formula $B_2N_2H_{10}$ which comprises, forming a mixture of hydrazine with 2 moles of sodium borohydride slurried in liquid tetrahydrofuran per mole of the hydrazine, slowly adding to said mixture per mole of the hydrazine two moles of phorsphoric acid diluted with liquid tetrahydrofuran to form a reaction mixture which evolves heat and hydrogen gas, cooling the reaction mixture to maintain it at a reaction temperature in the range of 0° to 40° C. as reaction takes place therein to form said hydrazine diborane which is dissolved in the liquid tetrahydrofuran, separating the solution of the hydrazine diborane in the liquid tetrahydrofuran to separate said solution from undissolved substances in the mixture, and recovering said dissolved hydrazine diborane from the liquid tetrahydrofuran.

9. Process for preparing hydrazine diborane having the empirical formula $B_2N_2H_{10}$ which comprises, forming a slurried mixture of $NaBH_4$ with an equimolecular proportion of $NH_4Cl$ as a Lewis acid in liquid tetrahydrofuran, adding to said slurried mixture hydrazine in a one mole proportion per two moles of the $NaBH_4$ to form a reaction mixture from which gas is evolved and said hydrazine diborane is formed and becomes dissolved in the liquid tetrahydrofuran, reacting the sodium borohydride with the ammonium chloride and the hydrazine under controlled conditions for maintaining a reaction between about 0° and 40° C., separating the resulting tetrahydrofuran solution of the hydrazine diborane from the slurried mixture, and separating the hydrazine diborane from said tetrahydrofuran solution.

References Cited in the file of this patent

Audrieth: "The Chemistry of Hydrazine," Wiley, p. 167 (1951).

Emeleus et al.: Nuclear Science Abstracts 5, p. 734, No. 4680 (1951).

Schechter: "Boron Hydrides and Related Compounds," Callery Chemical Co. (1954), p. 69.